United States Patent
Barazesh et al.

[11] Patent Number: 6,128,370
[45] Date of Patent: Oct. 3, 2000

[54] MULTIPLE TONE DETECTION USING OUT-OF-BAND BACKGROUND DETECTOR

[75] Inventors: Bahman Barazesh, Marlboro; Sherry Shuihong Zhu, Eatontown, both of N.J.

[73] Assignee: Lucent Technologies Inc., Murray Hill, N.J.

[21] Appl. No.: 08/906,818

[22] Filed: Aug. 6, 1997

[51] Int. Cl.[7] .............................. H04M 1/24; H04M 1/00
[52] U.S. Cl. ................................. 379/31; 379/6; 379/24; 379/386; 379/283
[58] Field of Search ..................... 379/1, 3, 6, 9, 379/10, 12, 16, 22, 23, 24, 26, 27, 29, 30, 31, 377, 391, 392, 406, 416, 387, 390, 283, 282, 386

[56] References Cited

U.S. PATENT DOCUMENTS

| | | | |
|---|---|---|---|
| 4,042,789 | 8/1977 | Richards | 379/386 |
| 4,119,808 | 10/1978 | Atkin | 379/31 |
| 4,947,425 | 8/1990 | Grizmala et al. | 379/410 |
| 5,216,702 | 6/1993 | Ramsden | 379/24 |
| 5,325,427 | 6/1994 | Dighe | 379/386 |
| 5,353,327 | 10/1994 | Adari et al. | 379/22 |
| 5,408,529 | 4/1995 | Greaves | 379/386 |
| 5,442,696 | 8/1995 | Lindberg et al. | 379/386 |
| 5,463,670 | 10/1995 | Chiang et al. | 379/27 |
| 5,485,515 | 1/1996 | Allen et al. | 379/391 |
| 5,524,148 | 6/1996 | Allen et al. | 379/391 |
| 5,526,419 | 6/1996 | Allen et al. | 379/391 |
| 5,577,117 | 11/1996 | Rabipour et al. | 379/386 |
| 5,587,998 | 12/1996 | Velardo, Jr. et al. | 379/391 |
| 5,588,053 | 12/1996 | Xie | 379/386 |
| 5,596,623 | 1/1997 | Uchiba et al. | 379/391 |
| 5,689,556 | 11/1997 | Gupta et al. | 379/391 |
| 5,699,421 | 12/1997 | Nirshberg et al. | 379/386 |
| 5,793,864 | 8/1998 | Ramsden | 379/391 |

*Primary Examiner*—Curtis A. Kuntz
*Assistant Examiner*—Rexford N Barnie
*Attorney, Agent, or Firm*—Ryan & Mason, L.L.P.

[57] ABSTRACT

A multiple tone detector includes n tone detectors, each detecting one of n distinct tones, where $n \geq 2$, and a background detector which generates a measure of accumulative background energy $E_{avg}$ in a frequency band or bands which do not include at least a subset of the n tones. The output of the background detector is applied to a smoothing filter, which generates the accumulative background energy measure $E_{avg}$ for a current frame as a weighted sum of the background detector output for the current frame and the background energy measure $E_{avg}$ from a previous frame. A parameter controlling response time of the smoothing filter is varied depending upon whether or not speech is determined to be present in the background portion of the input signal. A processor uses the energy measures from the n tone detectors and the background detector to compute n ratios, where a given ratio is the ratio of the energy measure of the ith tone to the accumulative background energy measure $E_{avg}$. The processor determines if each of the n ratios are greater than a threshold, and if the maximum of the n ratios is less than a constant times the minimum of the n ratios, in order to generate a decision as to whether the n tones are present in the input signal.

24 Claims, 3 Drawing Sheets

MULTIPLE TONE DETECTION USING OUT-OF-BAND BACKGROUND DETECTOR

FIELD OF THE INVENTION

The present invention relates generally to electronic circuits for use in voice/data switching systems, and more particularly to a dual tone detector for use in detecting tones in the presence of background signals and noise in a voice/data switching system.

BACKGROUND OF THE INVENTION

In a voice/data switching system based on the International Telecommunications Union (ITU-T) V.8bis standard, a pair of tones are used to switch an ongoing voice connection from a voice mode to a data mode. The voice connection may be established between a pair of users over a telephone line, ISDN line or other suitable communication medium. Each of the users has a modem which is configured to monitor the ongoing voice connection. When one of the users needs to send data over the voice connection, its modem first transmits a predetermined pair of tones over the connection. The modem at the other end of the connection is continually monitoring the connection for the presence of the pair of tones, and upon detecting the tones takes appropriate actions to enable it to receive and process the data.

Two related problems which can arise in detecting a pair of tones in a V.8bis system are false detection or "talkoff," in which a voice or background noise signal is falsely detected as the tone pair, and missed detection or "talkdown," where the presence of voice prevents detection of a received tone pair. These problems can be partially alleviated by appropriate selection of tone frequencies. For example, the selected tone frequencies should be different than the frequencies of most speech signals. However, design of a dual tone detector for the tone pair typically involves a tradeoff between the talkoff and talkdown failure modes. Although many other systems, such as dual-tone multiple-frequency (DTMF) systems, also rely on dual tone signaling to perform various functions over a voice connection, systems based on the V.8bis standard are particularly problematic in that the tones must be detected in the presence of either voice or silence, where the silence is actually low-level background noise.

A conventional dual tone detector includes a pair of narrow filters, with each of the filters tuned to one of the tone frequencies. The tone pair is determined to be present if the output energy of both filters exceeds a threshold for a predetermined period of time. However, this conventional approach is unable to adequately resolve the above-noted talkoff and talkdown problems, particularly if the received signal strength is highly variable as is typical of dial-up voice connections. If the threshold and time period are set too low, or the received signal strength is too high, false detection will be likely. Conversely, if the threshold and time period are set too high, or the received signal strength is too low, legitimate tone pairs may be missed. One known enhancement of the basic conventional dual tone detector involves disabling the detector when the total received signal strength is below a threshold. Other enhancements are based on taking Fourier transforms of the received signals. Unfortunately, these and other known enhancements remain unable to provide adequate tone detection in V.8bis systems and other important applications. A need therefore exists for an improved multiple tone detector which can better prevent false detection and missed detection than the above-described prior art techniques.

SUMMARY OF THE INVENTION

A multiple tone detector in accordance with the invention makes tone detection decisions based on ratios of the energy at each tone frequency with the background energy in another part of the frequency band. In addition, the process of generating the background energy measurement is altered for a given measurement interval depending on whether or not speech is present during that interval. The tone detection techniques of the invention are suitable for use in a wide variety of applications involving the detection of two or more tones.

In an illustrative embodiment, at least first and second detectors are used to generate measures of input signal energy for at least first and second tone frequencies, respectively. A background detector is configured to provide an output $E_{in}$ which is processed to generate a measure of accumulative background signal energy $E_{avg}$ in a frequency band which does not include the first and the second tones. The accumulative background energy measure $E_{avg}$ may be generated by applying the output $E_{in}$ of the background detector to a smoothing filter, which generates a weighted sum of the background detector output $E_{in}$ for a current frame n and the background energy measure $E_{avg}$ from a previous frame n−1, in accordance with an equation of the form:

$$E_{avg}(n) = \alpha E_{in}(n) + (1-\alpha) E_{avg}(n-1),$$

where $\alpha$ is a smoothing filter parameter. It should be noted that the frames may be overlapped. The parameter $\alpha$ controls the response time of the smoothing filter, and is varied depending upon whether or not speech is determined to be present in the background portion of the input signal. For example, the filter parameter $\alpha$ may be decreased if it is determined that there is no speech during a given interval, or increased if it is determined that speech is present during the given interval.

More generally, a multiple tone detector in accordance with the invention includes n tone detectors, each detecting one of n distinct tones, where $n \geq 2$. The background detector generates a measure of background signal energy in a frequency band or bands which do not include at least a subset of the n tones. The n tone detectors and the background detector may be implemented as elements of a digital signal processor. The processor uses energy measures from the n tone detectors and the background detector to compute n ratios Ri, i=1, 2, . . . n, where a given ratio Ri is the ratio of the energy measure of the ith tone to the background energy measure. The processor then determines if each of the n ratios are greater than a threshold, and if the maximum of the n ratios is less than a constant times the minimum of the n ratios, over two consecutive frames of the input signal, in order to generate a decision as to whether the n tones are present in the input signal.

A multiple tone detector in accordance with the invention provides excellent protection against the previously-described talkoff and talkdown problems of conventional tone detectors, for a wide variety of speech and noise signals. The multiple tone detector may be used, for example, to switch an ongoing voice connection from a voice mode to a data mode in a voice/data switching system. As noted above, the invention can be readily applied to the simultaneous detection of three or more tones, and is suitable for use with systems using V.8bis and any of a number of other communication standards. These and other features and advantages of the present invention will become more

3 apparent from the accompanying drawings and the following detailed description.

DETAILED DESCRIPTION OF THE INVENTION

The following description will illustrate the present invention using an exemplary voice/data switching system based on the V.8bis standard of ITU-T. It should be understood, however, that the invention is more generally applicable to any voice/data switching system, modem, or other multiple tone detection system in which it is desirable to provide improved multiple tone detection in the presence of speech signals or other types of background noise. The multiple tone detection system can be integrated into a personal computer or other digital processing device. Alternatively, the detection system may be implemented in a device which is arranged external to a personal computer or other device. It should be emphasized that the invention is not limited to detection of tone pairs, and can also be applied to tone detectors which detect sets of three or more tones.

Figure 1:
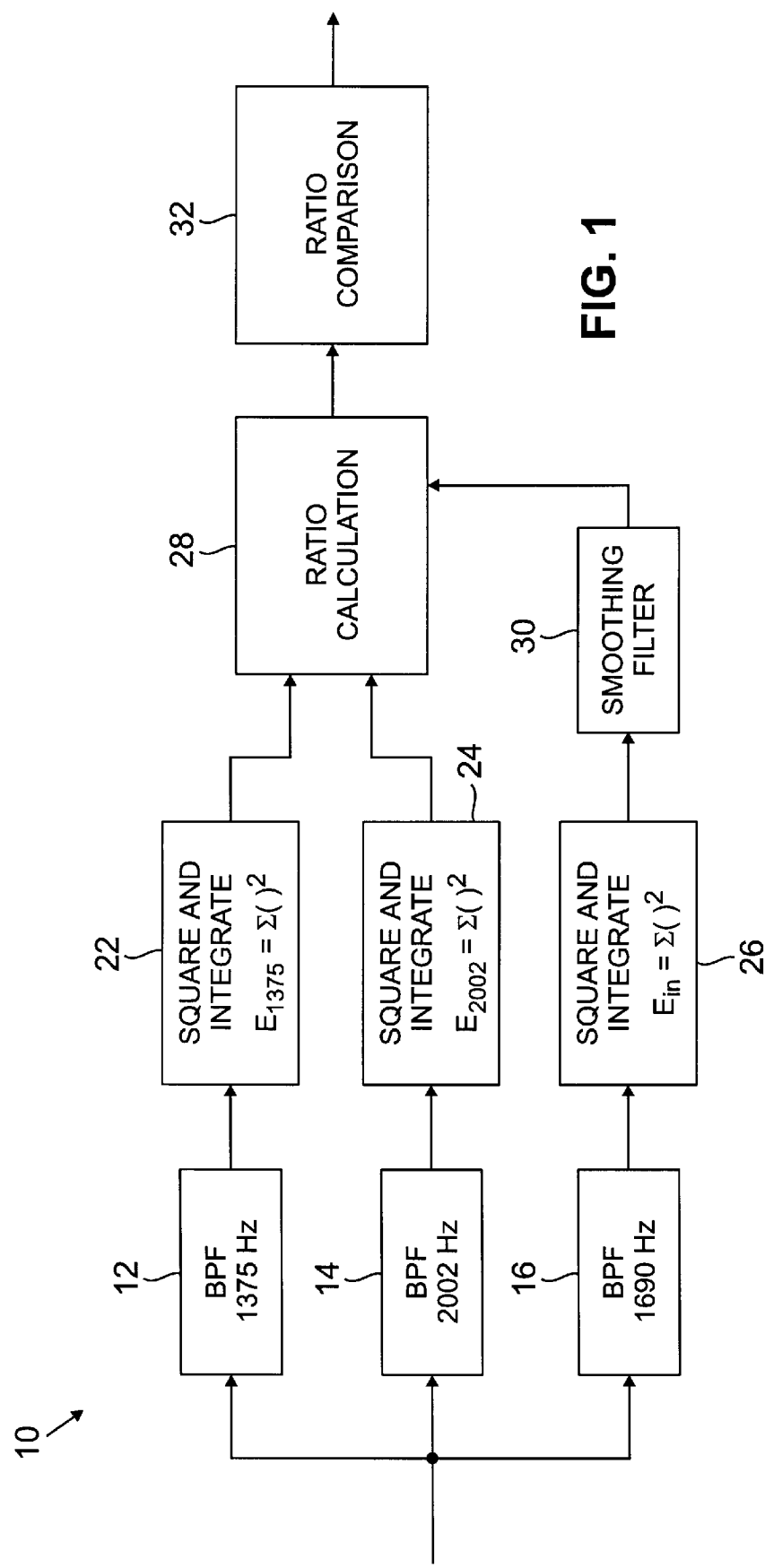
FIG. 1 is a block diagram of a dual tone detector in accordance with the invention.

FIG. 1 shows a tone detector 10 in accordance with an exemplary embodiment of the invention. The tone detector 10 may represent a digital signal processor, such that all operations shown in FIG. 1 are performed digitally. Alternatively, a subset of the elements of the tone detector 10 may be implemented as part of digital signal processor, while other elements are implemented as discrete or integrated electronic circuits. Linearly-coded 8 kHz samples of a received signal are applied to an input of the tone detector 10. The tone detector 10 includes a first narrow bandpass filter (BPF) 12 tuned to a first tone frequency of 1375 Hz, and a second narrow BPF 14 tuned to a second tone frequency of 2002 Hz. Each of the BPFs 12, 14 may have bandwidths of approximately 5 Hz. The tone detector 10 also includes a wide BPF 16, which may have a bandwidth of approximately 100 Hz. The wide BPF 16 is tuned to a frequency band located between the 1375 Hz and 2002 Hz tone frequencies. The wide BPF 16 is used to provide a measure of input signal energy, either voice or silence, other than that in the two tones.

The outputs of the BPFs 12, 14 and 16 are applied to inputs of respective square-and-integrate elements 22, 24 and 26. Each of these square-and-integrate elements processes the output of its corresponding BPF to generate a measure of the energy in the BPF passband. The elements 22 and 24 generate accumulative measures $E_{1375}$ and $E_{2002}$ of the signal energy in the vicinity of the first and second tone frequencies, respectively, while the element 26 generates an accumulative measure $E_{in}$ of the signal energy in the passband of filter 16 between the two tone frequencies. The elements 22, 24 and 26 may each include a square law device for determining energy, and an integrator for continually integrating the energy over an integration period which may be on the order of 30 milliseconds. The accumulative measures of energy $E_{1375}$, $E_{2002}$ and $E_{in}$ generated by elements 22, 24 and 26, respectively, are thus each generated in the form of a sum of squares. The measures $E_{1375}$ and $E_{2002}$ are supplied to inputs of a ratio calculation

4 element 28 which computes ratios of these measures to average or minimum energy measures as will be described in greater detail in conjunction with FIG. 2 below. Elements 12, 22 may be collectively referred to herein as a detector for the first tone, while element pairs 14, 24 and 16, 26 may similarly be referred to as detectors for the second tone and the background, respectively.

The background energy measure $E_{in}$ generated by element 26 is applied to a smoothing filter 30. The smoothing filter 30 may be implemented as a recursive digital low pass filter (LPF) which processes the input accumulative energy $E_{in}$ in accordance with the following equation:

$$E_{avg}(n)=\alpha E_{in}(n)+(1-\alpha)E_{avg}(n-1), \qquad (1)$$

where $E_{avg}$ is the accumulative background energy at the output of the smoothing filter 30, n is the current frame number, n−1 is the previous frame number, and the quantity α is a smoothing filter parameter which can take on a number of possible values, including 0.01, 0.1 or 0.5. The tone detection processing in this embodiment is thus performed on signal frames. It should be noted that the signal frames may, but need not, be overlapped. The value of α corresponds generally to the time response of the smoothing filter 30, such that a low value of α produces a slow time response, while a higher value of α produces a faster time response.

The accumulative background energy $E_{avg}$ is used as a measure of the background signal which is compared to energy at each of the tone frequencies. As will be described in greater detail below, the process for making this comparison, and also for setting the filter parameter α, varies depending on whether the background signal is believed to be speech or silence. It should again be noted that the term "silence" is intended to include low levels of background noise. The accumulative background energy $E_{avg}$ is supplied by the smoothing filter 30 to an input of the ratio calculation element 28, where it is used to compute ratios which will be described below. The resulting ratios are compared in a ratio comparison element 32, and the result of the comparison is used as the basis for a decision as to whether or not the pair of 1375 and 2002 Hz tones are present in the input signal applied to the dual tone detector 10.

Figure 2:
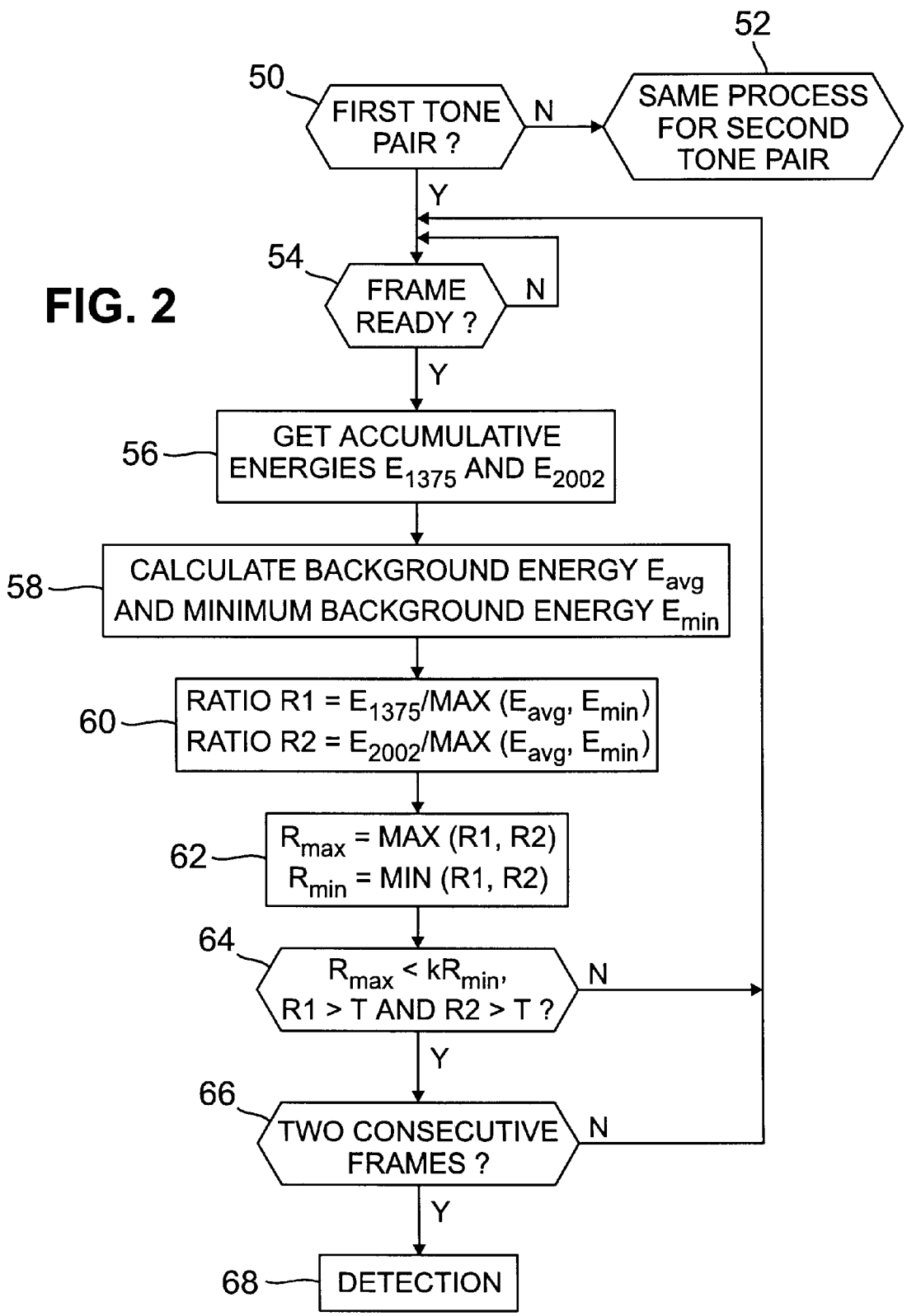
FIG. 2 is a flow diagram of the tone detection process in the dual tone detector of FIG. 1.

FIG. 2 is a flow diagram illustrating the operation of the tone detector 10 in greater detail. In step 50, a determination is made as to whether a first tone pair is to be detected. In this example, it will be assumed that the tone detector is configured to detect at least first and second tone pairs, where the first tone pair has the frequencies 1375 Hz and 2002 Hz noted above, and the second tone pair has the frequencies 1529 Hz and 2225 Hz. If the first tone pair is to be detected, the process moves to step 54 in order to determine if the first frame of input samples is ready. Frames will be assumed to be 30 milliseconds in duration, corresponding to the integration period of the elements 22, 24 and 26 of FIG. 1, such that the energy measures are based on integration over a full frame of samples. If the second tone pair is to be detected, step 52 indicates that a set of process steps similar to those to be described below for the first tone pair is followed for the frequencies of the second tone pair. As noted above, the invention is not limited to detection of tone pairs, and the configuration of tone detector 10 could be readily altered in a straightforward manner to accommodate detection of sets of three or more tones.

When step 54 determines that a frame of samples is ready, the accumulative energy measures $E_{1375}$, and $E_{2002}$ are obtained from elements 22 and 24, respectively, as shown in step 56. The accumulative background energy $E_{avg}$ and minimum background energy $E_{min}$ are then calculated in step 58, using a process to be described in greater detail in conjunction with FIG. 3 below. In step 60, ratios R1 and R2 are calculated in the ratio calculation element 28, as follows:

$$R1 = E_{1375}/\max(E_{avg}, E_{min}),$$

$$R2 = E_{2002}/\max(E_{avg}, E_{min}).$$

Step 62 then determines the maximum ratio $R_{max}$ and the minimum ratio $R_{min}$ in accordance with the following equations:

$$R_{max} = \max(R1, R2),$$

$$R_{min} = \min(R1, R2).$$

In Step 64, a determination is made as to whether $R_{max} < k\ R_{min}$, R1>T and R2>T, where k is a constant which may be approximately 3, and T is a predetermined threshold. If these three conditions are met, the process moves to step 66 to determine if two consecutive frames have been processed. If any one of the three conditions is not met, the process returns to step 54 to await the next frame of input samples. The presence of two consecutive frames in which $R_{max} < k\ R_{min}$, R1>T and R2>T is used as an indication that the 1375 Hz and 2002 Hz tone pair has been detected, as shown in step 68. The tone detection process is thus based on comparing ratios of tone energy to background energy against a threshold.

The processing steps described above for dual tone detection can be generalized for use in a multiple tone detector which includes n tone detectors, each generating an energy measure $E_i$, i=1, 2, ... n, for one of n distinct tones, where n≧2. The background detector in this case generates a measure of background signal energy in a frequency band or bands which do not include at least a subset of the n tones. The energy measures from the n tone detectors and the background detector are used to compute n ratios Ri, i=1, 2, ... n, where the ratios Ri are given by:

$$R1 = E_1/\max(E_{avg}, E_{min}),$$

$$R2 = E_2/\max(E_{avg}, E_{min}),$$

$$\ldots$$

$$\ldots$$

$$\ldots$$

$$Rn = E_n/\max(E_{avg}, E_{min}).$$

The n tones are determined to be present in the input signal if, for two consecutive frames, each of the n ratios is greater than a threshold, and the maximum ratio $R_{max}$ is less than a constant k times the minimum ratio $R_{min}$, where $R_{max}$ and $R_{min}$ are given by:

$$R_{max} = \max(R1, R2, \ldots Rn),$$

$$R_{min} = \min(R1, \ldots Rn).$$

Figure 3:
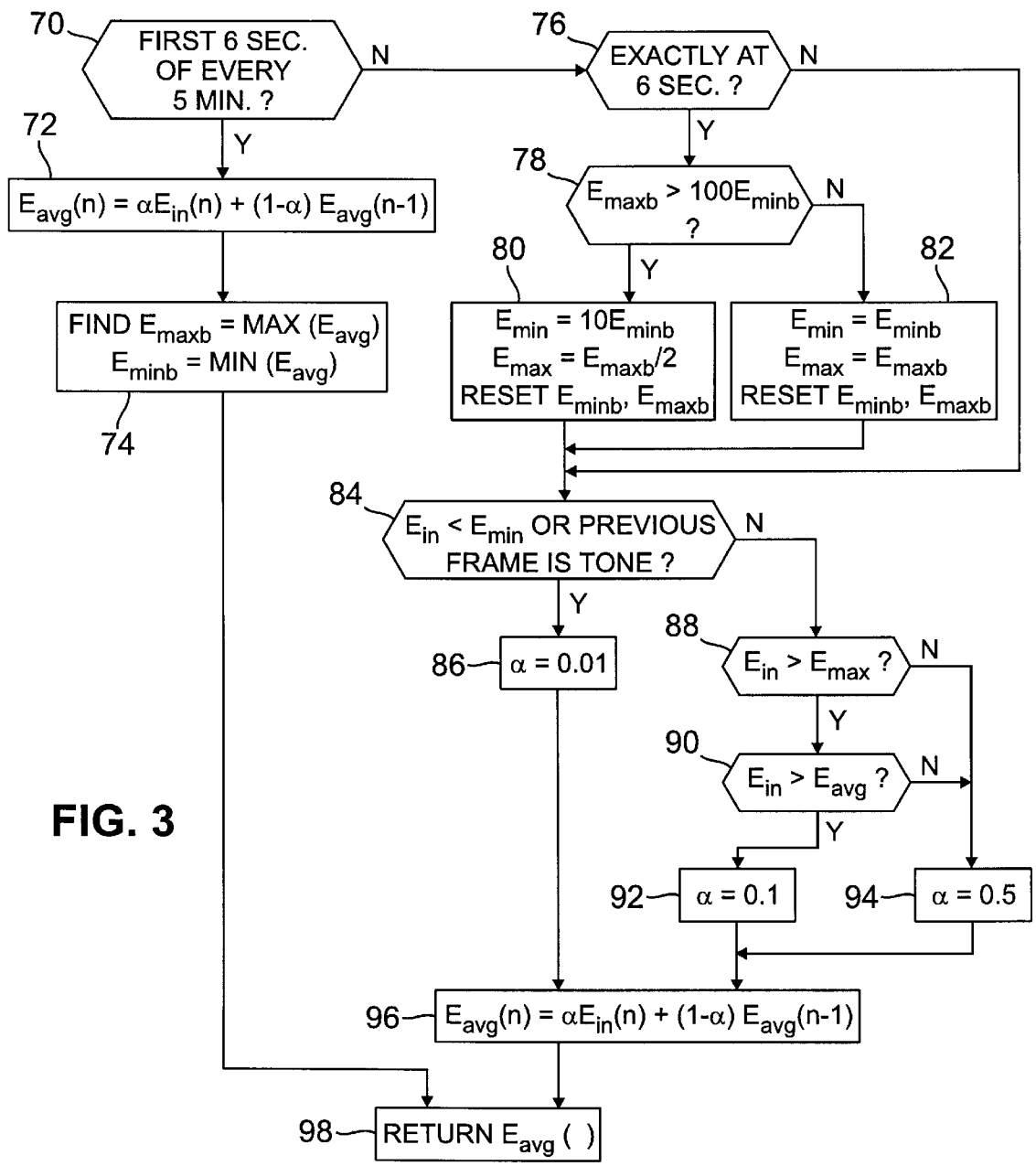
FIG. 3 is a flow diagram illustrating the determination and adjustment of parameters in the dual tone detector of FIG. 1.

FIG. 3 is a flow diagram illustrating the process of calculating the accumulative background energy $E_{avg}$ and the minimum background energy $E_{min}$, as required in step 58 of FIG. 2. Upon startup of the tone detector 10 and also at five minute intervals thereafter, the first six seconds of the background energy $E_{avg}$ are examined in order to perform a fast update of the smoothing filter parameter α and other values. During this six-second update period, the filter parameter α is initially set to 0.5, which as previously noted produces a relatively fast time response in the smoothing filter 30. Step 70 determines whether the tone detector is within the first six seconds of a given five minute interval. If it is, Equation (1) above is used in step 72 to update the $E_{avg}$ value for the current frame n, using the $E_{avg}$ value generated for the previous frame n–1, and the smoothing filter parameter α. In step 74, the maximum and minimum values of $E_{avg}$ are saved as $E_{maxb}$ and $E_{minb}$, respectively. The updated $E_{avg}$ value for the current frame n is then returned in step 98.

Step 76 determines if the end of the six-second update period associated with a given five minute interval has been reached. If the end of the six-second update period has been reached, step 78 determines if $E_{maxb}$ is greater than 100 $E_{minb}$, or in other words, if the ratio of $E_{maxb}$ to $E_{minb}$ is greater than 40 dB, which tends to suggest that speech is present in the background. If $E_{maxb}$ is greater than 100 $E_{minb}$, speech is assumed to be present in the background, and the $E_{min}$ and $E_{max}$ values are updated in step 80 as follows:

$$E_{min} = 10\ E_{minb}$$

$$E_{max} = E_{maxb}/2$$

and the $E_{minb}$ and $E_{maxb}$ values are reset. In other words, if speech is assumed to be present in the background, the $E_{minb}$ value is increased by a factor of ten, or 20 dB, and stored as $E_{min}$, while the $E_{maxb}$ value is decreased by a factor of two, or 6 dB, and stored as $E_{max}$. If $E_{maxb}$ is not greater than 100 $E_{minb}$ in step 78, it is assumed that the background is silence, and the $E_{min}$ and $E_{max}$ values are replaced in step 82 with the respective current $E_{minb}$ and $E_{maxb}$ values. In other words, when silence is assumed to be present in the background, the $E_{min}$ and $E_{max}$ values remain substantially unchanged. The $E_{minb}$ and $E_{maxb}$ values are then reset.

After the updates of steps 80 and 82, or if step 76 determines that the six-second update period is over, the process moves to step 84. Step 84 determines whether the background energy measure $E_{in}$ generated by element 26 of FIG. 1 is less than $E_{min}$, which would tend to suggest that the background is silence. If $E_{in}$ is less than $E_{min}$, it is assumed that the background is silence and α is set to 0.01 in step 86. A value of α=0.01 provides a relatively slow response time for the smoothing filter 30, which is appropriate in the absence of speech. Another situation in which α is set to 0.01 is if step 84 indicates that the previous frame has been determined, through the process of FIG. 2, to be a tone. In this situation, it is generally desirable not to drastically change the background estimation process. In either case, after α is changed to 0.01 in step 86, the $E_{avg}$ value is then updated in step 96 using the new value of α, and the updated $E_{avg}$ is returned in step 98.

If $E_{in}$ is determined to be greater than or equal to $E_{min}$ in step 84, a determination is made in step 88 as to whether $E_{in}$ is greater than $E_{max}$. If Ein is greater than $E_{max}$, and $E_{in}$ is greater than $E_{avg}$ in step 90, α is set to 0.1 in step 92. A value of $E_{in}$ which is greater than $E_{avg}$ indicates that Ein is increasing relative to its average value, suggesting that speech has started, so a different value of α is used in order to adjust the response time of the smoothing filter 30. If $E_{in}$ is not greater than either $E_{max}$ or $E_{avg}$, $E_{in}$ is decreasing, suggesting that speech is ending, and α is set to 0.5 in step 94 so as to provide a faster response time for the smoothing filter 30. In either case, the $E_{avg}$ value is updated in step 96 using the new value of α, and the updated $E_{avg}$ is returned in step 98. The updated $E_{avg}$ value returned in step 98 is used in the tone detection process of FIG. 2.

A multiple tone detector in accordance with the invention provides excellent protection against the previously-noted talkoff and talkdown problems of conventional tone detectors, for a wide variety of speech and noise signals. In the illustrative embodiment described above, tones can be reliably detected within about 300 milliseconds. This provides adequate detection margin in, for example, systems based on the V.8bis standard, which specifies that tones are present for 400 milliseconds. Other embodiments of the invention could provide tone detection in less time. The above-described embodiments of the invention are thus intended to be illustrative only. Numerous other alternative embodiments within the scope of the following claims will be apparent to those skilled in the art. For example, as noted above, the invention could be readily applied to the simultaneous detection of three or more tones, and is suitable for use with systems using any of a number of different communication standards.

What is claimed is:

1. A method of detecting a plurality of tones including at least a first tone and a second tone, the method comprising the steps of:
    generating from an input signal a measure of signal energy at the first tone, a measure of signal energy at the second tone, and a measure of background energy in a frequency band which does not include the first and the second tones; and
    processing the signal energy measures in order to generate a decision as to whether the first and second tones are present in the input signal, the decision generating operation including use of a decision criterion which includes a parametric adjustment dependent on whether the background energy is at a level suggestive of one of a presence and an absence of speech.

2. The method of claim 1 wherein the first and second tones are used to switch an ongoing voice connection from a voice mode to a data mode in a voice/data switching system.

3. The method of claim 1 wherein the generating step includes generating the measure of background energy by filtering and detecting a portion of the input signal in a frequency band which lies between the first and second tones.

4. The method of claim 1 wherein the generating step includes generating the measure of background energy in a smoothing filter which operates in accordance with an equation of the form:

$$E_{avg}(n)=\alpha E_{in}(n)+(1-\alpha)E_{avg}(n-1),$$

where $E_{in}$ is an output of a detector tuned to the frequency band which does not include the first and the second tones, $E_{avg}$ is the measure of background energy, n is a current frame number, n−1 is a previous frame number, and α is a smoothing filter parameter.

5. The method of claim 4 wherein the filter parameter α is altered for a given operating interval depending upon whether or not speech is detected in the input signal during the given interval.

6. The method of claim 5 wherein the filter parameter α is decreased in the absence of speech during the given interval.

7. The method of claim 5 wherein the filter parameter α is increased in the presence of speech during the given interval.

8. The method of claim 1 wherein the plurality of tones includes n tones and the processing step includes:
    computing n ratios, with each of the ratios representing the ratio of a measure of signal energy at a corresponding one of the n tones to the background energy measure; and
    determining if each of the n ratios is greater than a threshold, and if the maximum of the n ratios is less than a constant times the minimum of the n ratios, in order to generate a decision as to whether the n tones are present in the input signal.

9. The method of claim 8 wherein the computing and determining steps are repeated for two consecutive frames of the input signal before the decision is generated.

10. An apparatus for detecting a plurality of tones including at least a first tone and a second tone, the apparatus comprising:
    a digital signal processor operative to generate from an input signal a measure of signal energy at the first tone, a measure of signal energy at the second tone, and a measure of background energy in a frequency band which does not include the first and the second tones, and further operative to process the signal energy measures in order to generate a decision as to whether the first and second tones are present in the input signal, the decision generating operation including use of a decision criterion which includes a parametric adjustment dependent on whether the background energy is at a level suggestive of one of a presence and an absence of speech.

11. The apparatus of claim 10 wherein the first and second tones are used to switch an ongoing voice connection from a voice mode to a data mode in a voice/data switching system.

12. The apparatus of claim 10 wherein the processor generates the measure of background energy by filtering and detecting a portion of the input signal in a frequency band which lies between the first and second tones.

13. The apparatus of claim 10 wherein the processor includes a detector tuned to the frequency band which does not include the first and the second tones, and a smoothing filter having an input coupled to an output of the detector, wherein the smoothing filter generates the measure of background energy in accordance with an equation of the form:

$$E_{avg}(n)=\alpha E_{in}(n)+(1-\alpha)E_{avg}(n-1),$$

where $E_{in}$ is an output of the detector, $E_{avg}$ is the measure of background energy, n is a current frame number, n−1 is a previous frame number, and α is a parameter of the smoothing filter.

14. The apparatus of claim 13 wherein the processor is operative to alter the filter parameter α for a given operating interval depending upon whether or not speech is detected in the input signal during the given interval.

15. The apparatus of claim 14 wherein the processor is operative to decrease the filter parameter α in the absence of speech during the given interval.

16. The apparatus of claim 14 wherein the processor is operative to increase the filter parameter α in the presence of speech during the given interval.

17. The apparatus of claim 10 wherein the plurality of tones includes n tones, and the processor is further operative to compute n ratios, with each of the ratios representing the ratio of a measure of signal energy at a corresponding one of the n tones to the background energy measure, and to determine (i) if each of the n ratios is greater than a threshold, and (ii) if the maximum of the n ratios is less than a constant times the minimum of the n ratios, in order to generate a decision as to whether the n tones are present in the input signal.

18. The apparatus of claim 17 wherein the processor repeats the compute and determine operations for at least two consecutive frames of the input signal before the decision is generated.

19. An apparatus for detecting a plurality of tones including at least a first tone and a second tone, the apparatus comprising:

a plurality of tone detectors operative to generate, from an input signal, measures of signal energy for at least the first tone and the second tone;

a background detector operative to generate from the input signal a measure of background energy in a frequency band which does not include the first and the second tones; and a processor operative to process the signal and background energy measures in order to generate a decision as to whether the first and second tones are present in the input signal, the decision generating operation including use of a decision criterion which includes a parametric adjustment dependent on whether the background energy is at a level suggestive of one of a presence and an absence of speech.

20. The apparatus of claim 19 further including a smoothing filter having an input coupled to an output of the background detector, wherein the smoothing filter generates the measure of background energy in accordance with an equation of the form:

$$E_{avg}(n) = \alpha E_{in}(n) + (1-\alpha) E_{avg}(n-1),$$

where $E_{in}$ is present at the output of the background detector, $E_{avg}$ is the measure of background energy, n is a current frame number, n−1 is a previous frame number, and a is a parameter of the smoothing filter.

21. In a voice/data switching system, a method of detecting a plurality of tones including at least a first tone and a second tone, the method comprising the steps of:

generating from an input signal a measure of signal energy at the first tone, a measure of signal energy at the second tone, and a measure of background energy in a frequency band which does not include the first and the second tones; and generating ratios from the signal energy measures and comparing the ratios to at least one threshold in order to generate a decision as to whether the first and second tones are present in the input signal, the decision generating operation including use of a decision criterion which includes a parametric adjustment dependent on whether the background energy is at a level suggestive of one of a presence and an absence of speech.

22. In a voice/data switching system, an apparatus for detecting a plurality of tones including at least a first tone and a second tone, the apparatus comprising:

at least one signal processor operative to generate from an input signal a measure of signal energy at the first tone, a measure of signal energy at the second tone, and a measure of background energy in a frequency band which does not include the first and the second tones, and further operative to generate ratios from the signal energy measures and compare the ratios to at least one threshold in order to generate a decision as to whether the first and second tones are present in the input signal, the decision generating operation including use of a decision criterion which includes a parametric adjustment dependent on whether the background energy is at a level suggestive of one of a presence and an absence of speech.

23. The method of claim 4, wherein the current frame and the previous frame overlap one another.

24. The method of claim 13, wherein the current frame and the previous frame overlap one another.

* * * * *